United States Patent [19]

Flemons

[11] 3,858,446

[45] Jan. 7, 1975

[54] VELOCITY MEASUREMENT SYSTEM WITH SYNCHRONIZED DEMODULATION

[75] Inventor: Ralph Seymour Flemons, Peterborough, Ontario, Canada

[73] Assignee: Canadian General Electric Company Limited, Toronto, Ontario, Canada

[22] Filed: Apr. 10, 1973

[21] Appl. No.: 349,742

[30] Foreign Application Priority Data

May 1, 1972 Great Britain .................. 20133/72

[52] U.S. Cl. ............ 73/194 A, 73/194 E, 328/133, 329/50

[51] Int. Cl. .............................................. G01f 1/00

[58] Field of Search ................ 73/53, 194 A, 194 E; 328/133; 329/50, 124, 112

[56] References Cited

UNITED STATES PATENTS

| | | | |
|---|---|---|---|
| 3,588,720 | 6/1971 | Fluhr | 328/133 X |
| 3,654,564 | 4/1972 | Tisi et al. | 328/133 X |
| 3,699,462 | 10/1972 | Kietzer et al. | 329/112 |
| 3,762,221 | 10/1973 | Coulthard | 73/194 E |

*Primary Examiner*—Charles A. Ruehl
*Attorney, Agent, or Firm*—R. A. Eckersley

[57] ABSTRACT

A system such as a flow velocity measuring system relies upon obtaining a signal having a slight phase difference from a carrier signal, due to a change in signal circuit characteristic. The disclosed arrangement provides highly sensitive detection of such slight phase differences, including the provision of signal components in mutual quadrature relation permitting selection and switching as a useful output signal of that component having an instantaneous value and polarity to meet a predetermined condition of positive-going value for a selected sense of phase change, in a leading or in a lagging sense. The system may be selected to be substantially insensitive to changes in carrier frequency, or to be amplitude insensitive.

6 Claims, 4 Drawing Figures

LEGEND

Figure 2:
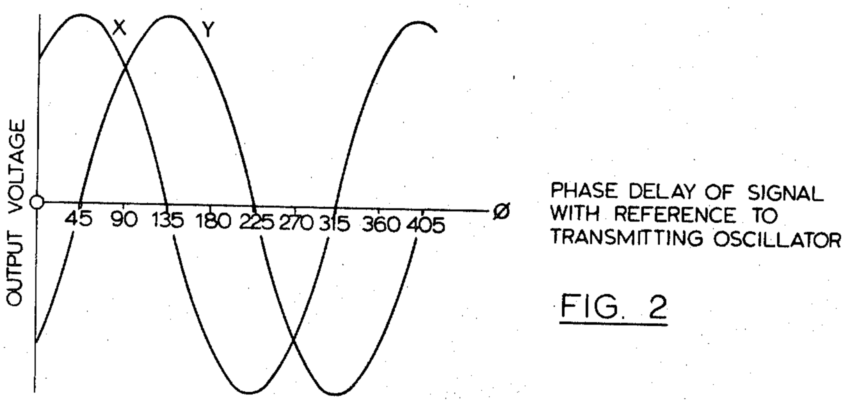

11 SINE WAVE OSCILLATOR, FREQUENCY Fo
12, 14 ULTRASONIC TRANSDUCERS
13 TRANSMISSION PATHS THROUGH LIQUID
15 BROADBAND AMPLIFIER WITH AGC AND LIMITING MODES
16 NETWORK TO RETARD SIGNAL PHASE 45°
17 NETWORK TO ADVANCE SIGNAL PHASE 45°
18, 19 LIMITERS TO PRODUCE SQUARE WAVE AT Fo
20, 21 MULTIPLIERS USED AS SYNCHRONOUS DEMODULATORS
22 ROOT-SUM-SQUARE COMBINER
23 UNITYGAIN INVERTER X CHANNEL
24 UNITYGAIN INVERTER Y CHANNEL
25, 26, 27, 28 DIODES TO SELECT MAXIMUM POSITIVE SIGNAL
29, 30, 31, 32 SELECTOR CIRCUITS
33, 34, 35, 36 ELECTRONIC SWITCHES
37 OUTPUT AMPLIFIER
39 SQUARE WAVE SYNC INPUT TO 20
40 SQUARE WAVE SYNC INPUT TO 21
41 AMPLIFIED SIGNAL INPUT TO 20, 21
42, 43 HIGH-PASS FILTERS
44, 45 LOW-PASS FILTERS
46 ALTERNATE QUASI AMPLITUDE-DEMODULATED OUTPUT
47 AMPLITUDE-DEMODULATED OUTPUT OF 22
48 SELECTED PHASE-DEMODULATED SIGNAL OUTPUT
49 SIGNAL X, OUTPUT OF 20
50 SIGNAL Y, OUTPUT OF 21
51 SIGNAL Xinv OUTPUT OF 23
52 SIGNAL Yinv OUTPUT OF 24
53 SYNCHRONIZING SIGNAL FROM OSCILLATOR 11

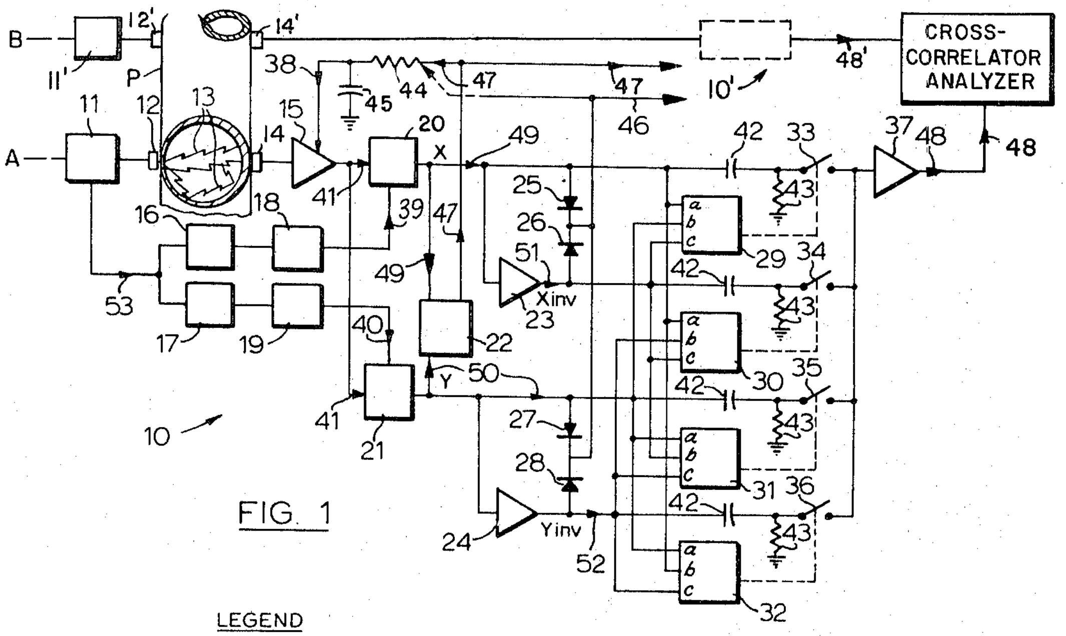

FIG. 1

LEGEND

- 11 SINE WAVE OSCILLATOR, FREQUENCY Fo
- 12, 14 ULTRASONIC TRANSDUCERS
- 13 TRANSMISSION PATHS THROUGH LIQUID
- 15 BROADBAND AMPLIFIER WITH AGC AND LIMITING MODES
- 16 NETWORK TO RETARD SIGNAL PHASE 45°
- 17 NETWORK TO ADVANCE SIGNAL PHASE 45°
- 18, 19 LIMITERS TO PRODUCE SQUARE WAVE AT Fo
- 20, 21 MULTIPLIERS USED AS SYNCHRONOUS DEMODULATORS
- 22 ROOT-SUM-SQUARE COMBINER
- 23 UNITYGAIN INVERTER X CHANNEL
- 24 UNITYGAIN INVERTER Y CHANNEL
- 25, 26, 27, 28 DIODES TO SELECT MAXIMUM POSITIVE SIGNAL
- 29, 30, 31, 32 SELECTOR CIRCUITS
- 33, 34, 35, 36 ELECTRONIC SWITCHES
- 37 OUTPUT AMPLIFIER
- 39 SQUARE WAVE SYNC. INPUT TO 20
- 40 SQUARE WAVE SYNC. INPUT TO 21
- 41 AMPLIFIED SIGNAL INPUT TO 20, 21
- 42, 43 HIGH-PASS FILTERS
- 44, 45 LOW-PASS FILTERS
- 46 ALTERNATE QUASI AMPLITUDE-DEMODULATED OUTPUT
- 47 AMPLITUDE-DEMODULATED OUTPUT OF 22
- 48 SELECTED PHASE-DEMODULATED SIGNAL OUTPUT
- 49 SIGNAL X, OUTPUT OF 20
- 50 SIGNAL Y, OUTPUT OF 21
- 51 SIGNAL Xinv OUTPUT OF 23
- 52 SIGNAL Yinv OUTPUT OF 24
- 53 SYNCHRONIZING SIGNAL FROM OSCILLATOR 11

VELOCITY MEASUREMENT SYSTEM WITH SYNCHRONIZED DEMODULATION

This invention is directed to a system for measuring small changes in phase delay.

In the measurement of flow velocities of fluids it is often desirable to detect some parameter related to the fluid flow. In particular the determination of fluid velocity may be achieved by determining the transport time of naturally occurring or stimulated anomalies within the flowing fluid.

In measuring the flow of fluids within pipes previous systems have utilized various properties of the flowing fluid in order to obtain an accurate determination of flow velocity within a pipe. Thus, one method has relied upon the well-known principle whereby the transit time of an ultrasonic pulse differs when transmitted along the pipe, in the direction of flow or oppositely thereto. The reduction of transit time and the increase in transit time respectively produced have been used to provide a measure of the flow velocity in the pipe.

In the case of another system of flow velocity determination a pair of spaced stations transmit ultrasonic beams across the direction of flow, normal to the pipe axis, in which the passage of ultrasonic propagation anomalies is monitored at each station, disclosed in Application Ser. No. 349,743 by the present inventor, filed Apr. 10, 1973, assigned to the present assignee, now abandoned. The present invention provides a system of great sensitivity, capable of detecting small changes of phase as produced by turbulence or minute compositional anomalies and suitable for use in the referenced velocity measurement system. The subject system is of sufficient sensitivity that transverse components of fluid flow, as caused by random turbulence, may be analyzed and identified, thus permitting the determination of the transport time of a flow anomaly possessing such transverse components between two ultrasonic beams in spaced relation along the pipe, using well-known cross-correlation techniques. For this technique two spaced anomaly detecting stations are required, each applied to one of the ultrasonic beams and having a sensitive phase change detection system according to the present invention.

An object of the present invention is the provision of a modulation detection system having a high gain characteristic to facilitate detection of small dynamic changes in phase or small, short term changes in frequency.

A further object of the present invention is the provision of a modulation detection system using a phase demodulator having a useful output yielding significantly larger signals than a conventional Frequency Modulation (FM) detector.

A further object of this invention is the provision of a synchronous phase demodulator substantially insensitive to changes in amplitude of the received signal.

A further object of this invention is the provision of a synchronous phase demodulator having an output useful in combination with a radio frequency amplifier to provide automatic gain control of the amplifier.

A further object of the present invention is the provision of a system selectively operable in a selected one of the two modes:

1. Operation in synchronous dynamic phase demodulation substantially insensitive to changes in carrier amplitude or steady-state frequency.
2. Operation in amplitude demodulation, substantially insensitive to steady-state or dynamic changes in phase or frequency.

A further object of this invention is the provision of a synchronous demodulator which operates in conjunction with its related transmitter, to permit significant changes in carrier frequency without affecting operation of the demodulator, while assuring the rejection of interference from all other carrier waves separated a few kilohertz or more from the frequency related transmitter.

A further object is the provision of a phase demodulated output signal selected to produce a consistent output polarity with increasing phase delay, for example to swing more positively with increase in phase delay. Alternatively, an output may be provided which swings more negatively with respect to an increase in phase delay. Where an ultrasonic beam is passing through a non-uniform fluid flowing substantially normally to the beam, the phase delay of the signal is modified due to transient components of turbulent flow coincident with the direction of the beam. Experience indicates that relatively small swings of phase in the order of plus or minus 10 degrees, may take place during an elapsed time corresponding to the passage of the turbulent or other anomaly across the beam. In the case of fluid flowing normal to the beam at a velocity of 120 inches per second, for a beam width of 0.5 inches, the minimum time is approximately 4 milliseconds. The maximum elapsed time for a phase swing is a function of the size of the anomaly (in the stream flow direction). From experimental determination this maximum time has been found to be as much as 100 milliseconds duration.

An indication of the demodulation sensitivity necessary to provide effective anomaly detection under existing conditions may be obtained, as follows:

Using the relationship $$\Delta f = \Delta \phi f_m$$

where $\Delta$ f is the carrier frequency change $\Delta \phi$ is the phase swing (or phase change)

$f_m$ is the assumed frequency of the modulation idealized as a sinusoidal function. Then for values $\Delta \phi = 10° = 0.175$ radians and $f_m = 100$ Hz corresponding to a sinusoidal function with a period of 10 milliseconds.

This gives $\Delta f = 0.175 \times 100 = 17.5$ Hz.

Considering this small change as a percentage change of the frequency $f_c$- of the ultrasonic carrier wave (typically $10^6$ Hz), Then the modulation index $M = \Delta f/f_c$ $M = 1.75 \times 10^{-5}$ Satisfactory operation at this low index is not normally possible using conventional F.M. detection techniques.

Owing to non-dynamic variations which may take place in the signal path, such as dimensional instabilities, temperature variations or compositional changes in fluid flowing through a pipe, unavoidable slow phase shifts of long duration and large amplitude may take place. An object of the present invention is the provision of a phase demodulation system capable of providing continuous detection of dynamic flow anomalies despite the presence of such non-dynamic uncontrolled slow phase shifts.

The present invention further provides in a system having an input signal varying in dynamic phase relation from a substantially synchronous reference signal, wherein the dynamic phase change relation varies in a phase retarding or in a phase advancing sense, the method of providing a conditioned output signal having a positive-going value for a selected sense of phase change of the input signal, and a negative-going value for the opposite sense of phase change of the input signal, comprising the steps of modifying the reference signal by splitting into two synchronous components in substantially mutual quadrature relation, synchronously demodulating the input signal with reference to the reference signal components to provide first and second output signals having amplitude variation respectively as sine and cosine functions of the phase angle between the input signal and the reference signal; inverting the output signals to provide third and fourth output signals of opposite respective polarity, comparing the four output signals in groups of threes to identify which signal of the four has an instantaneous value and polarity to meet the conditioned output requirements, and switching the so identified signal to a useful output.

Alternatively, the present invention provides, in a system having an input signal varying dynamically in amplitude and phase relation from a substantially synchronous reference signal, the method of providing a conditioned output signal varying in response to the amplitude of the input signal and substantially insensitive to changes in phase between the input signal and the reference signal, comprising the steps of modifying the reference signal by splitting into two synchronous components in substantially mutual quadrature relation, synchronously demodulating the input signal with reference to the quadrature reference components to provide first and second signals having amplitudes as respective direct functions of the amplitude and phase of the input signal, and taking the root of the sum of the squares of the first and second signals to obtain an output signal having an amplitude substantially only a function of the amplitude of the input signal and independent of the phase angle between the input signal and the reference signal.

As a further embodiment, the present invention provides, in a system having an input signal varying in dynamic phase relation from a substantially synchronous reference signal, the method of providing an output signal as an amplitude modified replica of the input signal, largely independent of the phase angle and variations thereof between the input signal and the reference signal, comprising the steps of modifying the reference signal by splitting into two synchronous components in quadrature relation, synchronously demodulating the input signal with reference to the quadrature reference components to provide first and second output signals, inverting the output signals to provide third and fourth output signals of opposite respective polarity, selecting the output signal of greatest amplitude, using a diode selector circuit, and switching said identified signal to provide the desired amplitude demodulated replica of the input signal.

Figure 3:
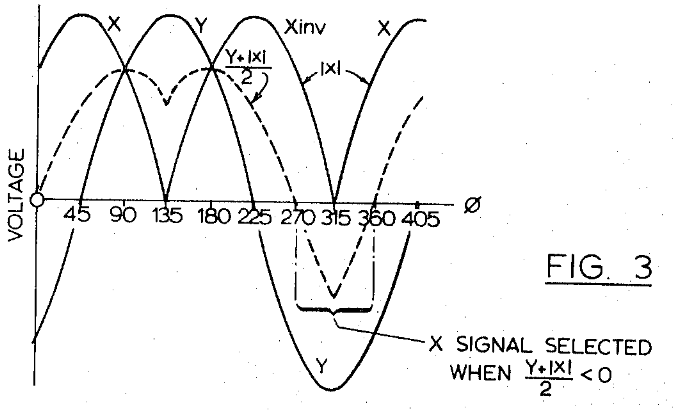
Figure 4:
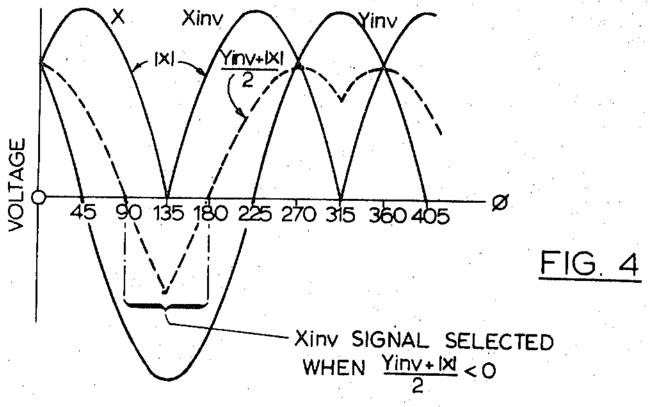

Certain embodiments of the present invention are described, reference being made to the accompanying drawings wherein;

FIG. 1 is a block diagram of a demodulator system according to the present invention used with a cross correlation analyzer; and FIGS. 2, 3 and 4 show characteristic curves of the apparatus in providing demodulator output, for differing signal path conditions.

Turning to FIG. 1, the arrangement shows a pipe containing liquid through which ultrasonic signals are passed at spaced stations to a pair of demodulator systems 10. Ultrasonic signals from a sine wave oscillator 11 are passed. At each station on the pipe an ultrasonic transducer 12 secured to the outer surface of the pipe wall emits signals from the oscillator 11 which travel by a variety of paths 13 to a receiving transducer 14 secured to the opposite side of the pipe. The signal output from transducer 14 is connected to amplifier 15. This is a broad band amplifier, and in the illustrated embodiment is capable of automatic gain control (A G C) via input 38, or of operating at high gain as a limiter.

The output from amplifier 15 is directed to a pair of parallel connected multipliers 20, 21 functioning as synchronous demodulators. A synchronous output 53 from the oscillator 11 is fed via phase shifters 16, 17 and limiters 18, 19 to multipliers 20, 21 respectively, as synchronizing signals 39, 40 respectively. The phase-shifter 16 retards the synchronizing signal 39 by 45° while the phase-shifter 17 advances the synchronizing signal 40 by 45°. Limiters 18, 19 modify the sinusoidal signals from 16, 17 to provide square wave synchronizing signals for optimum operation of multipliers 20, 21. The multiplier 20 has an output, signal 49, designated as X and multiplier 21 has as output, signal 50, designated as Y.

A root-sum-square (R S S) combiner 22 receives input signals 49 and 50 from the multipliers 20, 21 respectively and provides an output signal 47 having an average level proportional to the received carrier level. The a.c. component of signal 47 represents the amplitude modulation on the ultrasonic signal. Signal 47 after filtering by components 44 and 45, can be used as an input to the A G C circuit of amplifier 15.

The output signals 49 and 50 from multipliers 20, 21 are also connected respectively to an X-channel unity-gain inverter 23 having output signal 51 and to a Y-channel unity-gain inverter 24 having output signal 52, the signal 51 representing a value "minus X," represented as $X_{inv}$; and the signal 52 representing a value "minus Y," represented as $Y_{inv}$.

Diodes 25, 26, 27 and 28 connected with their cathodes to line 46 direct the maximum positive signal of 49, 50, 51 or 52 to 46, providing an alternative output approximately representing the amplitude modulation on the ultrasonic signal and/or an alternative input 38 to the A G C input of amplifier 15, via filter 44, 45.

The direct and inverted X and Y signals 49, 50, 51 and 52 are connected with selector circuits 29, 30, 31 and 32 having electronic switches 33, 34, 35 and 36 respectively connected thereto, connecting on their output side with an output amplifier 37. High-pass filters each comprising capacitor 42 and resistor 43 connecting with amplifier 37 which has a low-pass characteristic, permit the passage of phase demodulated signals in a predetermined "dynamic" frequency range to signal output 48.

In the network certain signal forms are indicated numerically. Thus, the A G C circuit of amplifier 15 has input 38, and the square wave reference inputs 39, 40 pass to multipliers 20, 21 respectively, which have as outputs 49 and 50 respectively. The inverted form of signals 49 and 50 are designated 51 and 52 respectively.

Discussing further the functional relationship provided by a demodulator according to the present invention, the demodulator 10 receives a synchronizing signal 53 from the sine wave oscillator 11, which causes it to substantially reject so called non-dynamic signals of other frequencies that may be imposed on its input, unless within a few kilocycles of the synchronizing signal. The critical separation is achieved by the bandwidth selected for the demodulator output circuit. This arrangement permits variation of the synchronizing signal over a range of at least 2:1 while retaining the multipliers 20, 21 positively locked to the oscillator 11 and effectively rejecting interference.

Changes in signal amplitude referred to as being non-dynamic, that may occur in the system due perhaps to changes in frequency or to changes in temperature or density of the transmission medium are rendered substantially of no account by the characteristics of the RF amplifier provided, when operated with A G C or as a limiter.

In operation the oscillator 11 provides a signal for passage across the pipe. The signal received from the transducer 14 is a compound signal including all components and reflections and modulations effected in transmission across the pipe. The signal goes to amplifier 15, to form the dynamically varying signal input 41 for the multiplier modules 20, 21, functioning as synchronous demodulators.

The reference inputs 39 and 40 are obtained using phase shift networks 16 and 17 to achieve approximately 45° retardation and 45° advancement of the reference phase, so as to achieve substantially 90° phase difference between the outputs of 16 and 17. The phase shifted sine-wave signals are modified by limiters 18, 19 to produce square wave reference signals 39, 40, in controlling relation with the synchronous demodulators 20, 21.

Discussing the effects of modulation with relation to the characteristic curves shown in FIGS. 2, 3 and 4, FIG. 2 shows respective X and Y output voltages 49 and 50 from the demodulators 20 and 21 in relation to the phase delay angle of the demodulator input signal 41, with reference to the oscillator signal 53.

In the case where the signal 41 is delayed 45°, it comes into phase with the delayed reference component 39, so that the output X (49) achieves its maximum positive value. However, signal 41 delayed 45° is 90° out of phase with the advanced reference component 40 and the output Y (50) is zero.

If the signal 41 lags still further, going from 45° to 135° the X output component (49) diminishes to zero, while the Y output component (50) increases to a maximum.

The X and Y relationship may be expressed:

$$X = V_{max} \cos(\phi - 45°) \quad (1)$$

$$Y = V_{max} \sin(\phi - 45°) \quad (2)$$

As plotted in FIGS. 2, 3 and 4, the abscissa is in terms of phase angle, and not time. Thus, should the phase and amplitude of signal 41 remain constant, the demodulator would have a positive or a negative DC voltage.

A change in amplitude in the signal 41 is represented by a change in the value of $V_{max}$ in equations (1) and (2) above, and hence in the amplitude of the demodulator output.

A change in the phase of the input signal by modulation may cause the output to become more positive with increase in phase delay(e.g., where $Y$ has a lag angle $\phi = 45°$) or to become more negative (e.g., with $X$ having a lag angle $\phi = 135°$) or $Y$ having a lag angle $\phi = 225°$).

By feeding the $X$ and $Y$ components to the RSS combiner 22, which performs the operation $\sqrt{X^2 + Y^2} = M$, it can be shown that $M = V_{max}$, thereby providing an amplitude-demodulated signal 47 which may also control automatically the gain of amplifier 15, as a feed back input 38.

The outputs 49 and 50 of the synchronous demodulators 20, 21 are fed respectively to amplifiers 23, 24 which are connected as unity gain inverters, thereby providing inverted signals 51 and 52, respectively equal to negative $X$ and negative $Y$ values ($X_{inv}$ and $Y_{inv}$).

Four selector circuits 29, 30, 31 and 32 each have three of the four values 49, 51, 50, 52, fed thereto. Discussing this arrangement with respect to selector circuit 29, for instance, the circuit has three inputs $a$, $b$ and $c$ to which are connected 49($X$), 50($Y$) and 51($X_{inv}$) respectively. Referring to FIG. 3, the circuit selects the more positive value of $X$ and $X_{inv}$ designated as $|X|$, the absolute value of $X$. The arithmetic average of $Y$ and $|X|$, having the value $\frac{1}{2}(Y + |X|)$, may then be determined. This function has a negative value when the phase delay angle $\phi$ lies between 270° and 360°. Referring to FIG. 2 it will be seen that in this region, as the phase delay angle increases so the value of $X$ becomes more positive. The output of circuit 29 causes switch 33 to close, thereby connecting the $X$ signal to output amplifier 37.

Considering selector circuit 30, having inputs $a$, $b$ and $c$ connected to receive signals 49($X$);51($Y_{inv}$);51($X_{inv}$) respectively, as will be seen in FIG. 4, the combining of these inputs to determine the sign of the function $\frac{1}{2}(Y_{inv} + |X|)$ leads to the closing of switch 34 if the function has a negative value which causes the $X_{inv}$ signal to be fed to output amplifier 37 when $\phi$ lies between 90° and 180°. From FIG. 2 it will be seen that as the phase delay angle increases through this range $X$ becomes more negative. Hence $X_{inv}$ becomes more positive, to feed an appropriate signal to output amplifier 37.

Similarly the selector 31 receives inputs $Y$; $X_{inv}$ and $Y_{inv}$; and selector 32 receives inputs $Y$; $X$ and $Y_{inv}$, respectively. When the phase angle lies between 0° and 90° the function $\frac{1}{2}(X_{inv} + |Y|)$ is negative, and selector 31 closes switch 35, thereby feeding the $Y$ signal to amplifier 37, to give a positive-going output signal for an increasing phase delay angle.

When the phase delay angle lies between 180° and 270° the value $\frac{1}{2}(X + |Y|)$ is negative and selector 32 closes switch 36, thereby feeding the $Y_{inv}$ output to amplifier 37.

The selector circuits 29, 30, 31 and 32 are mutually interlocked, to ensure operation of only one switch at a time.

The high pass filters 42, 43 (a capacitor/resistor combination) remove the d.c. and slowly changing or non-dynamic components of the $X$; $X_{inv}$; $Y$ and $Y_{inv}$ voltages, thus avoiding large transient voltages during the switching operation, but permitting the passage of so-called dynamic fluctuating components produced by flow induced phase shifts in the portion 13 of the ultrasonic transmission path.

Operation of the amplifier 15 as a limiter makes the demodulator 10 insensitive to changes of amplitude in the input signal, produced by uncontrollable changes in the characteristics of ultrasonic propagation in the liquid in the pipe.

Thus there is provided a method of detecting small changes in phase of a carrier signal passing through a nonconstant path, including the steps of separating the carrier signal before transmission into at least two components in mutual phase spaced relation, separately multiplying or otherwise combining the phase modulated signal with the respective components of the carrier signal to provide modified component signals, inverting the modified component signals to additionally provide respective inverted modified component signals and selectively switching the modified component signals and inverted modified component signals in accordance with the relative magnitudes of the respective signals to provide a consistent phase demodulated output.

A particular advantage afforded by the present invention is that in using a cross-correlation technique to compare flow modulated signals received at two stations spaced along a stream for determining the flow velocity of a stream in which flow anomalies are detected, the present invention permits the automatic selection of signals having a consistent relationship between the anomaly and the resulting polarity of the demodulated signals to facilitate the rapid establishment of cross-correlation between signals from two independent transmission paths, each associated with a respective station.

Thus, as shown in FIG. 1, two stations A and B are located a predetermined distance apart along the pipe P, having the components associated with station B identified by primed numerals such as 10′, 11′, etc. The respective demodulated outputs 48, 48′ from the demodulator systems 10, 10′ are applied to a cross-correlator analyzer, well known to those skilled in the art, by means of which the passage of a suitable flow anomaly along the pipe between stations A and B may be detected and correlated, and the velocity of passage determined.

It is contemplated that the present invention may be utilized in like manner in other embodiments incorporating variable signal paths such as long distance radio or telecommunications. Arrangements in the prior art rely upon precise synchronization between signals, which is achieved by the use of a phase-lock loop. These prior arrangements are, however, sensitive to noise and may produce synchronization with the wrong signal. Utilizing the present invention permits the use of distantly spaced, stable substantially synchronous oscillators, wherein one oscillator may be slowly changing relative to the other. Owing to the use of demodulated and inverted demodulated signals, the present invention makes possible the provision of a consistent output presented in a preselected sense. Thus, in the illustrated embodiment the output signal presented for output amplification shows an increasingly positive value as the detected phase delay angle increases. Any slight lack of synchronism is compensated for automatically in the selective switching function, thus permitting the use of oscillators in substantial synchronization.

The present invention also is useful for investigating variations or variability of a signal transmission path such as in relation to ionaspheric reflection of radio signals or variations induced by atmospheric disturbances as used in meteorological investigations and detection of the motion of a signal-reflecting object.

As an example, in the case of a continuous wave radar when used in ranging on to a moving target, the present invention permits observations with extreme sensitivity of erratic or periodic motions of the distant body.

A further application of the present invention makes possible the continuous monitoring of the motion of power lines or other structures in a wind, using reflected electromagnetic radiation such as radar or airborne ultrasonic signals or like reflected signals.

What I claim as new and desire to secure by Letters Patent of the United States is:

1. In a system having an input signal varying in dynamic phase relation from a substantially synchronous reference signal, wherein the dynamic phase change relation varies in a phase retarding or a phase advancing sense, the method of providing a conditioned output signal to meet the requirement of having a positive-going value for a selected sense of phase of said input signal, and a negative-going value for the opposite sense of phase change of said input signal, comprising the steps of: modifying said reference signal by generating from it two synchronous reference components having a mutual phase difference of approximately 90°; synchronously demodulating said input signal with reference to said synchronous reference components to provide first and second output signals having amplitudes respectively sine and cosine functions of the phase angle between said input signal and said reference signal; inverting said output signals to provide third and fourth output signals of opposite respective polarity, comparing the four output signals in groups of threes to identify which signal of the four has an instantaneous value and polarity to meet said conditioned output requirement, and switching the identified said signal to a useful output.

2. The method as claimed in claim 1 wherein said reference signal and said input signal originate with a common oscillator, said input signal being transduced to an ultrasonic signal, said ultrasonic signal being transmitted transversely through a flowing stream to produce modulation of the signal, being then reconverted by transducer to an electrical signal having a differing phase relation with said reference signal.

3. The method as claimed in claim 2 wherein said conditioned and identified signal is amplified for passage to an output.

4. The method as claimed in claim 3 wherein said amplified signal is submitted, together with a corresponding signal from a location spaced along the stream, to a cross-correlation analysis whereby the two signals are correlated to establish the time delay of correlatable components of the signals from the two locations as an accurate measure of stream speed of flow.

5. A signal modulation detection system to provide conditioned output signal voltage to meet the requirement of having a positive-going value for a selected sense of phase change of an input signal and a negative-going value for the opposite sense of phase change of an input signal corresponding to a change in phase modulation of the input signal characteristic and substantially insensitive to changes in amplitude modulation of the input signal, comprising a source of synchronizing reference signals; phase change means connected thereto having a first output to provide a phase advanced synchronous signal component and a second output to provide a phase retarded synchronous signal component, said advanced and retarded reference components having a mutual phase difference of approximately 90°; amplifier means to receive a said modulated input signal, having the output thereof connected to a pair of synchronous demodulators, each said demodulator receiving a respective one of said advanced or retarded reference signal components, the output from each said demodulator being connected with an inverter means, the output from the two inverters together with the output from the two demodulators comprising four outputs having separate signals mutually separated in phase approximately 90°, 180° and 270° selection means connected with said four outputs to identify the one of said signals in accordance with the desired conditioned characteristic, and switching means operated by said selection means to switch said desired conditioned signal to an output amplifier.

6. Apparatus as claimed in claim 5 wherein said selection means comprises four polarity sensitive selector circuit means, each receiving three of said four separate signal outputs to identify which signal has an instantaneous positive-going value for a selected sense of phase change of said input signal in a phase lagging or a phase leading sense relative to said reference signal, whereby the selected output is substantially insensitive to the variation in the amplitude of said input signal.

* * * * *